US005944338A

United States Patent [19]
Simpson

[11] Patent Number: 5,944,338
[45] Date of Patent: Aug. 31, 1999

[54] WHEELCHAIR

[76] Inventor: Maurice Simpson, 1504 Charter Oak Dr., Rochester Hills, Mich. 48309

[21] Appl. No.: 08/821,955

[22] Filed: Dec. 27, 1996

[51] Int. Cl.[6] .......... B62B 3/02

[52] U.S. Cl. .......... 280/650; 280/47.38; 280/47.41; 280/657

[58] Field of Search .......... 280/650, 651, 280/657, 658, 642, 643, 30, 47.38, 47.41; 297/440, 485

[56] References Cited

U.S. PATENT DOCUMENTS

| | | | |
|---|---|---|---|
| 4,231,582 | 11/1980 | Moss | 280/87 |
| 4,239,259 | 12/1980 | Martinez | 280/649 |
| 4,580,803 | 4/1986 | Davis | 280/289 |
| 4,632,451 | 12/1986 | Lee | 297/153 |
| 4,655,471 | 4/1987 | Peek | 280/242 |
| 4,679,509 | 7/1987 | Sampson, Jr. | 108/27 |
| 4,728,119 | 3/1988 | Sigafoo | 280/657 |
| 4,974,870 | 12/1990 | Jarke et al. | 280/650 |
| 5,112,069 | 5/1992 | Aldus et al. | 280/657 |
| 5,255,934 | 10/1993 | Wilson | 280/657 |
| 5,340,139 | 8/1994 | Davis | 280/304.1 |
| 5,358,263 | 10/1994 | Aldus et al. | 280/657 |
| 5,568,933 | 10/1996 | Mizuno | 280/650 |
| 5,669,620 | 9/1997 | Robbins | 280/657 |

*Primary Examiner*—Richard M. Camby
*Attorney, Agent, or Firm*—Peter Loffler

[57] ABSTRACT

A wheelchair is comprised of a foldable chair, having a selectively inclinable back support, fixedly or removably attached to a castor-based platform. A foot rest is slidably attached to the platform. A padded walker and a padded head rest each having height adjustment capability are each removably attachable to the wheelchair. A leg rest having incline capability above and below the horizontal is removably attachable to the wheelchair. A selectively inclinable tray is removably attachable to the wheelchair. A toilet assembly is removably attachable to the wheelchair.

20 Claims, 7 Drawing Sheets

WHEELCHAIR

BACKGROUND OF THE INVENTION

1. Field of the Invention

The present invention relates to a multifunction wheelchair capable of supporting multiple user and caregiver comfort accessories.

2. Background of the Prior Art

Most wheelchairs are designed to give enhanced locomotion capability to the user. Giving a user freedom of travel is the single major functional aspect that designers strive to achieve. Designs that utilize advanced composite materials, use minimal friction drive wheels, and motorized drive assist are all well known in the art. The reason for this design mind set is that a person typically begins to use a wheelchair after losing the use of one or both legs rendering walking impossible. As a person's legs are used for walking, the wheelchair is designed to duplicate, and thus replace, the walking function. While this syllogism is sound, it fails to address other major functional aspects required of a wheelchair.

Many people, especially the elderly and the chronically wheelchair confined, spend a large portion of their waking time in a wheelchair yet have very modest needs for locomotion. Such a user sees the wheelchair not merely as an extension of the user's legs, but as an extension of their entire body. For these wheelchair users, comfort is of paramount importance while locomotion is only of secondary importance.

Furthermore, chronic wheelchair users tend to have one or more caregivers that must interact with the wheelchair. Providing the caregiver with a high level of comfort in the interaction with the wheelchair, permits the caregiver to offer better and more focused attention to the user.

Therefore, there is a need in the art for a wheelchair that appreciates the user's high level need for comfort, especially during prolonged or repeated use. The wheelchair must give the user the ability to perform most daily functions within the wheelchair with relative ease and simplicity while allowing the user to maintain a strong level of dignity. The wheelchair must permit a caregiver to interact with the wheelchair without undue hardship or time demand. Ideally, the wheelchair will be of relatively simple and straightforward in design, operation, and maintenance. Simple and compact transport of the wheelchair are also desired.

SUMMARY OF THE INVENTION

The wheelchair of the present addresses the aforementioned needs in the art. The present invention is comprised of a modified lawn-type chair, having a selectively inclinable back support, that is either removably or fixedly attachable to a platform. The platform, which is castor based, has a foot rest slidably disposed thereon. A padded walker is removably attachable to the chair at a user selected height. The walker permits a user to use the wheelchair for assisted walking. The walker also allows a caregiver to comfortably push the wheelchair. A padded head rest is removably attachable to the wheelchair at a desired height, in similar fashion to attachment of the walker. The head rest has a deep recess for solid support of a user's head. A tray is removably attachable to the chair. The tray, which is selectively inclinable, permits eating or reading therefrom. A leg rest is removably attachable to the chair. The leg rest is selectively inclinable above and below the horizon. Positioning the leg at horizontal allows a user to sleep in the chair. A padded mattress can be placed thereon for additional comfort. Inclining the leg rest above the horizontal, aids people with conditions such as Edema. A toilet assembly is removably attachable to the chair. When attached to the chair, the toilet bowl may be removed and emptied without requiring the user to get off of the chair.

The wheelchair of the present invention provides a device that has a multiplicity of functions that greatly enhance the comfort to the user. A caregiver also has added functionality and comfort of use. Each add-on unit is simple in design and is quick and easy to install and remove. The device incorporates simple and straightforward design and can be created using standard manufacturing techniques.

BRIEF DESCRIPTION OF THE DRAWINGS

Similar reference numerals refer to similar parts throughout the several views of the drawings.

DESCRIPTION OF THE PREFERRED EMBODIMENT

Figure 7:
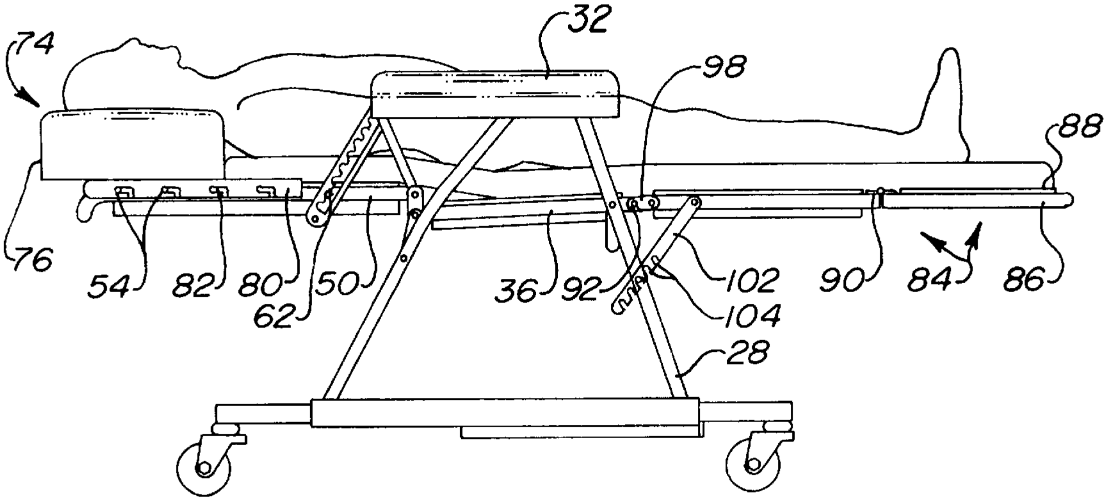
FIG. 7 is a side elevation view of the wheelchair in a generally horizontal position with the head rest and leg rest attached.
Figure 8:
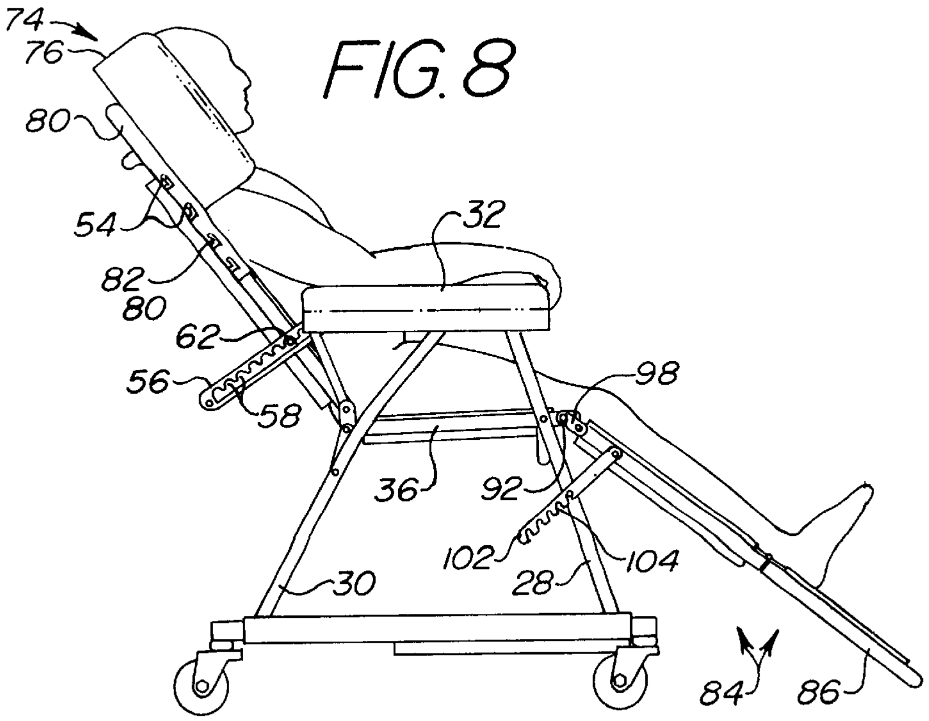
FIG. 8 is a side elevation view of the wheelchair with the tray assembly attached.
Figure 9:
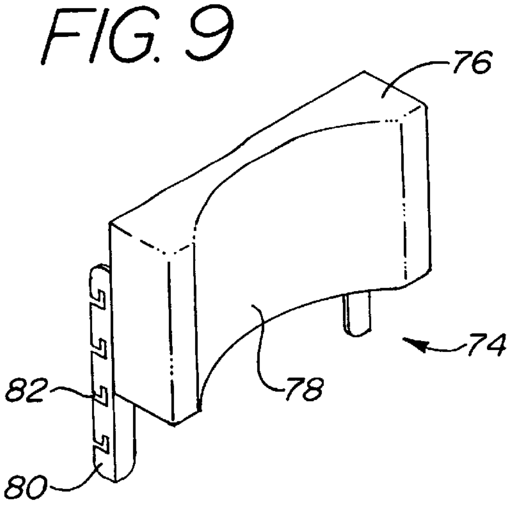
FIG. 9 is a front isometric view of the head rest.

Referring now to the drawings, it is seen that the wheelchair of the present invention, generally denoted by reference numeral 10, is comprised of a platform 12, having an encompassing lip 14, and having a plurality of castors 16 (although regular large wheelchair-type wheels can also be used). The castors 16 can all be 360-degree rotatable castors or the rear castors can be unidirectional. An optional foot pedal wheel brake 18 can be located on each castor 16. The castors 16 can be fixedly attached directly to the platform 12. Alternately, as seen in FIGS. 7 and 8, each castor 16 can be attached to a rod 20 that is slidably received within a channel (not illustrated) on the platform 12 permitting extension and retraction of the castors 16 relative to the platform 12.

A foot rest 22 is slidably disposed within a housing 24 located on the underside of the platform 12. The end of the foot rest 22 has a lip 26.

A chair is either fixedly or removably secured to the top of the platform 12. By utilizing removable securement of the chair to platform 12, straightforward disassembly and transport of the device 10 is realized. If releasable securement of chair to platform 12 is desired, any appropriate releasable attachment means known in the art can be utilized.

The chair can be of any appropriate type. Ideally, the chair is a modified lawn-type chair that has a selectively inclinable back support. The modifications include means for attaching a walker or head rest to the back of the chair, means for attaching a leg rest to the chair, means for attaching a tray to the chair, and means for attaching a toilet assembly to the chair.

Figure 2:
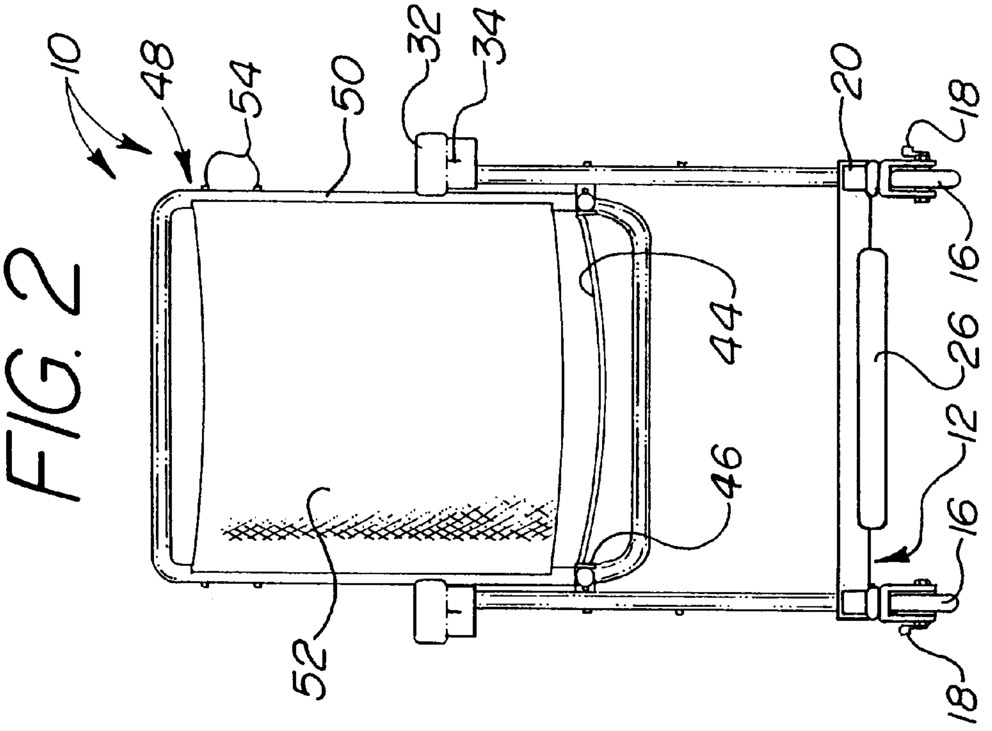
FIG. 2 is a front elevation view of the wheelchair.
Figure 1:
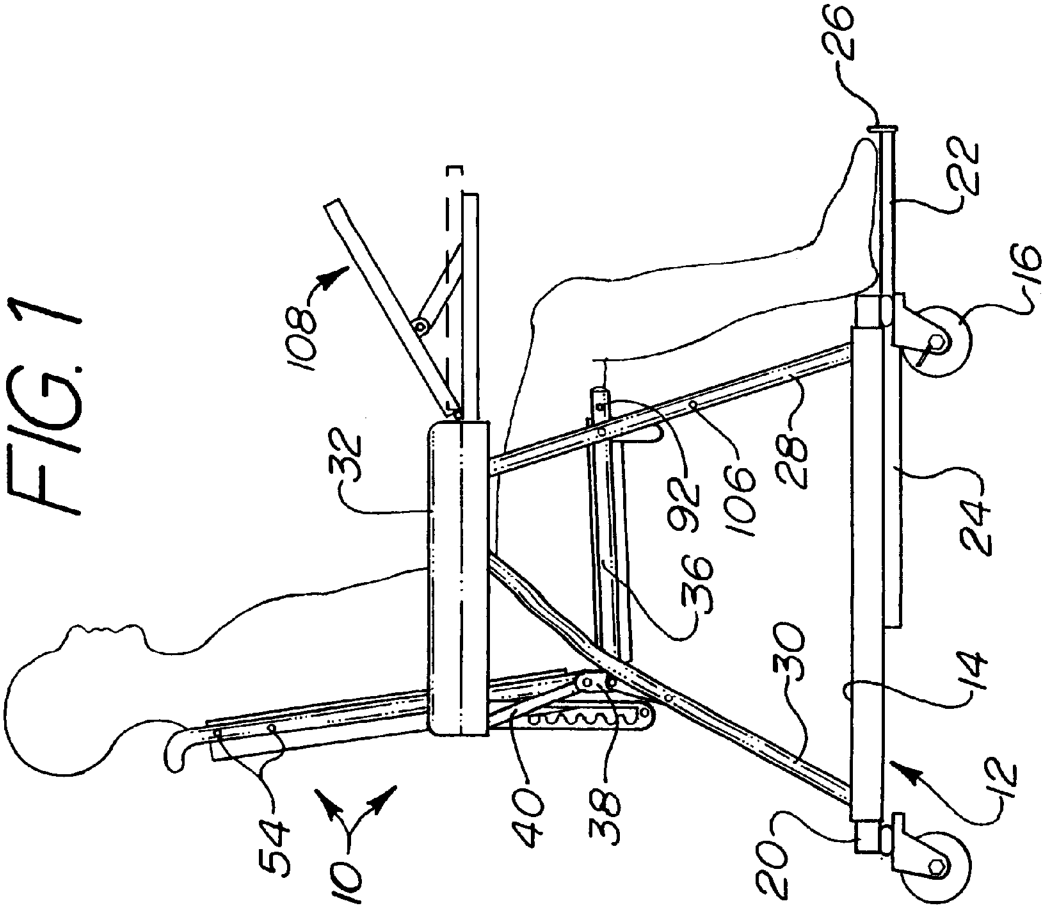
FIG. 1 is a side elevation view of the wheelchair of the present invention.
Figure 4:
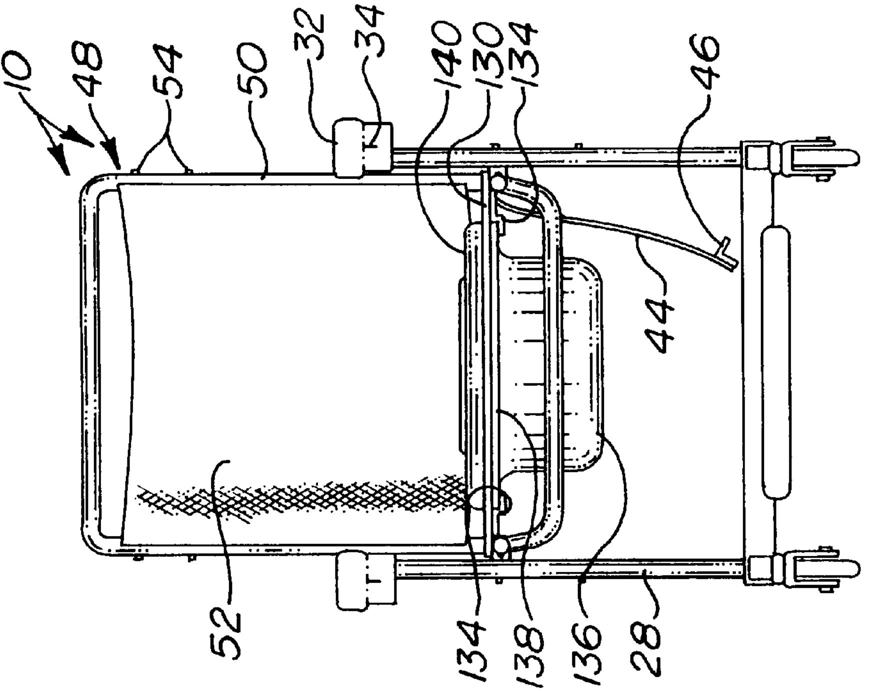
FIG. 4 is a front elevation view of the wheelchair with the toilet assembly attached.
Figure 3:
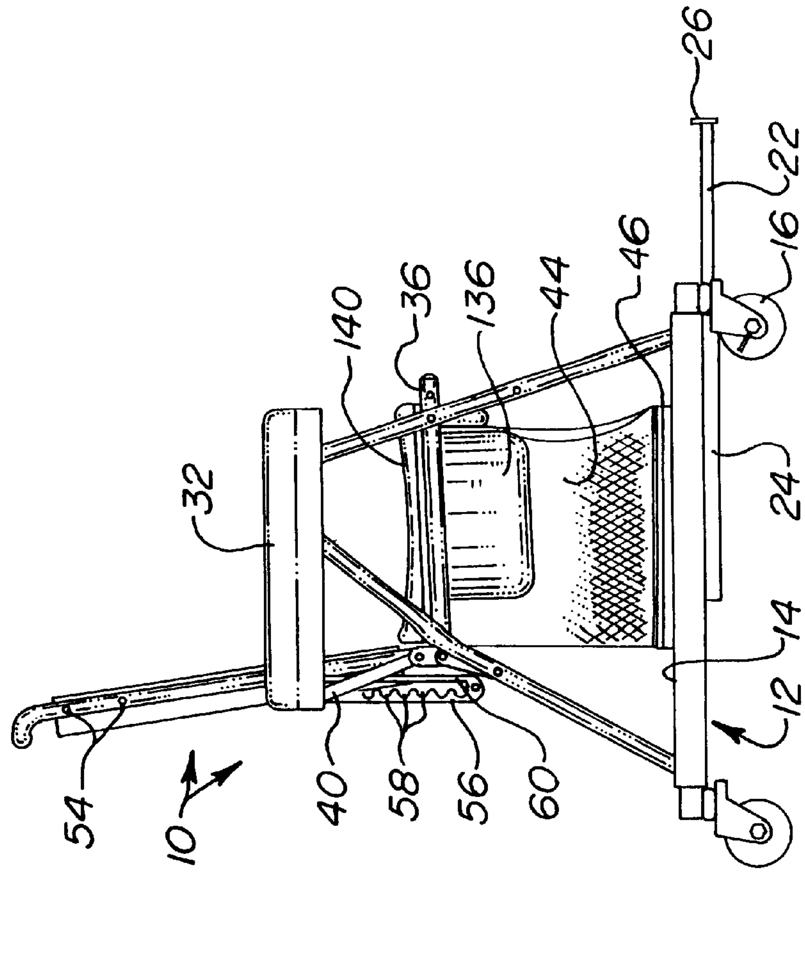
FIG. 3 is a side elevation view of the wheelchair with the toilet assembly attached.
Figure 6:
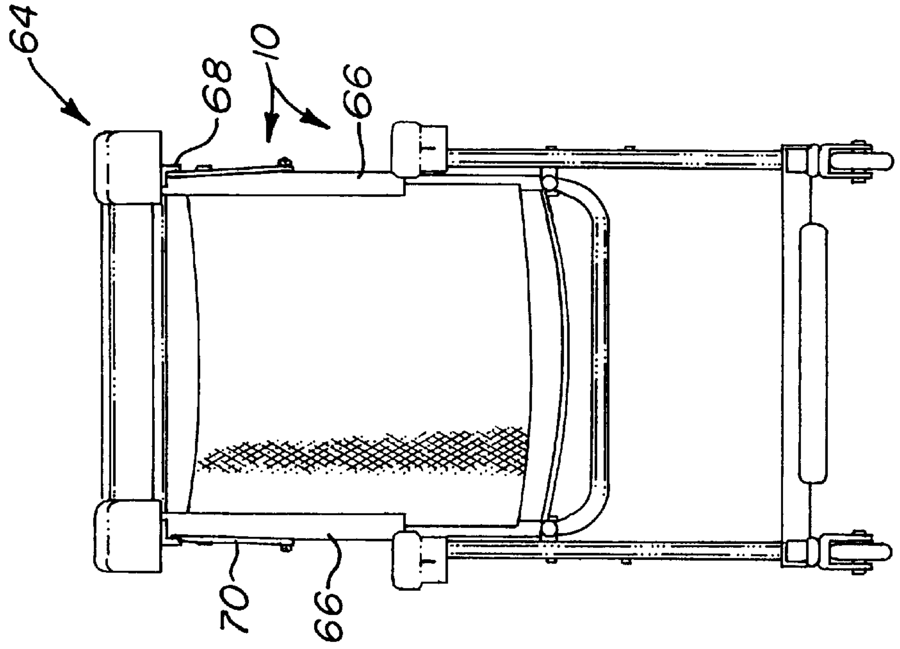
FIG. 6 is a front elevation view of the wheelchair with the walker attached.
Figure 5:
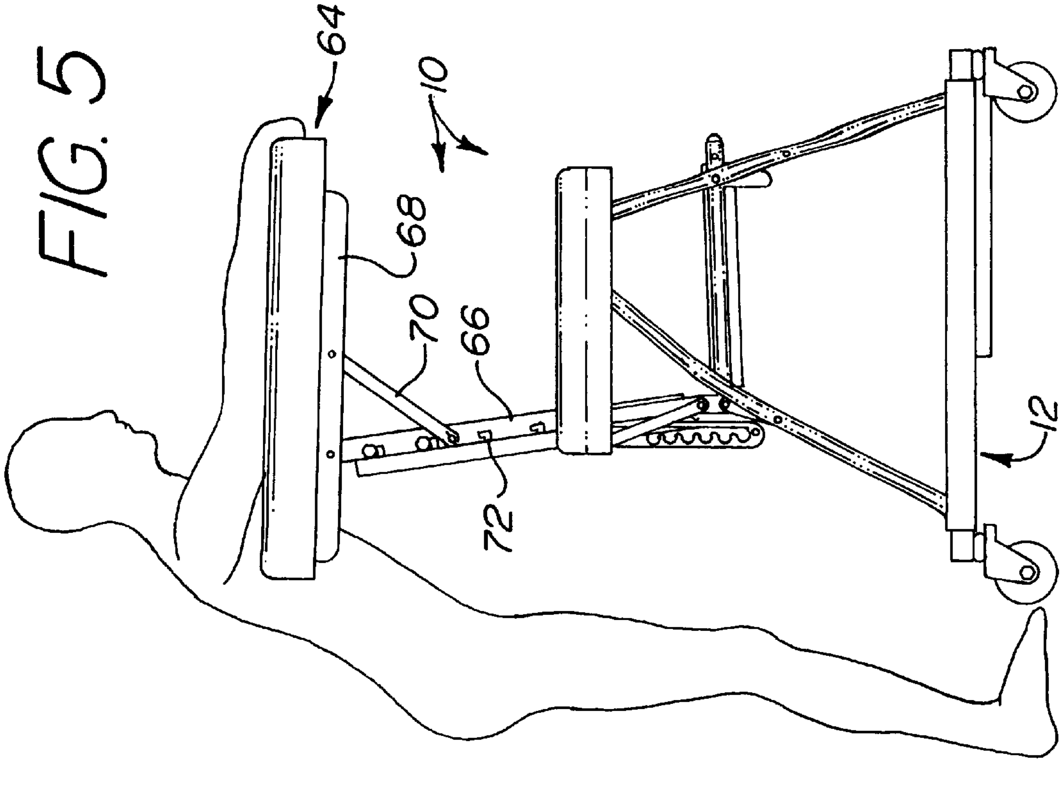
FIG. 5 is a side elevation view of the wheelchair with the walker attached.

By way of example, it is seen that the chair is comprised of a pair of front legs 28 and a pair of rear legs 30. An arm rest 32 with padding is attached, either securely, pivotally or releasably, to the top of one of the front legs 28 and one of the rear legs 30 while a second corresponding arm rest 32 with padding is attached to the tops of the other two legs. As seen in FIGS. 2 and 4, an opening 34 to a channel is located on the front of each arm rest 32.

A pair of seat support rails 36 is pivotally attached to the front legs 28, one rail 36 to each leg 28. The opposing end of each seat support rail 36 is pivotally attached to the medial portion of an adjustable linkage 38. The lower portion of each linkage 38 is pivotally attached to the rear leg 30. A support strut 40 is pivotally attached to the upper portion of each linkage 38, with the opposing end of each strut 40 attached, either pivotally or releasably, to the end of the arm rest 32. A generally straight or generally U-shaped torsion brace 42 extends between the seat support rails 36 at their points of attachment to the front legs 28. A cross member (not illustrated) can connect the two linkages 38.

A seat portion 44 of canvas or other suitable material extends between the pair of seat support rails 36. The seat portion 44 is fixedly secured to one of the seat support rails 36 and is releasably secured to the other seat support rail 36. The releasable securement can be achieved in any suitable fashion including, as seen in FIG. 4, the use of angle metal 46 attached to the seat portion 44 which is receivable within a corresponding slot (not illustrated) on the seat support rail 36.

A back support frame 48, having a generally U-shape or a generally rectangular shape, is pivotally attached to the bottom of each support strut 40, at the support strut's point of attachment to the linkage 38. Extending between the vertical side members 50 of the back support frame 48 is a back support 52 made from canvas or other suitable material. A pair of pegs 54 extends outwardly from each of the side members 50.

A generally flat bracket 56 is pivotally attached to each support strut 40 at the support strut's point of attachment to the arm rest 32. As seen, the bracket 56 has a plurality of notches 58 that are enclosed by a closure bar 60. A peg 62 extends outwardly from each side member 50 below the pair of pegs 54. Each peg 62 is receivable within one of the notches 58 of the bracket 56 such that it supports the back support frame 48 in some level of incline. If desired, the notches 58 can be one way ramped. This system permits selective inclining of the back support frame 48 with a standard lawn chair-type mechanism known in the art.

As seen in FIGS. 5, 6, 13, and 14, a walker 64 can be removably attached to the wheelchair 10. The walker 64 is comprised of a generally H-shaped padded member (although a generally U-shaped member may be used, the opposing U-shaped, or more properly H-shaped, member is preferred) with a pair of rods 66 extending downwardly therefrom. Support rails 68 and support struts 70 can also be utilized as shown. By way of example, the walker 64 is attached to the back support frame 48 by providing one or more aligned L-shaped slots 72 on either rod 66. One pair of aligned slots 72 are registerable with the pair of pegs 54 on the side members 50 such that the pegs 54 are received and rest within the closed part of the L-shaped slot 72. By providing more than one set of L-shaped slots 72, the walker 64 is height adjustable for different sized users. The walker 64 may be attached to the wheelchair 10 by any other appropriate means and may have any other appropriate height adjustment means. The walker 64 may be used by a caregiver to push the wheelchair 10. The caregiver will be positioned within the walker 64 and can rest his arms along the length of the walker 64. Alternately, the walker 64 can be used by the user whenever the user desires to be more ambulatory. The padded member increases the comfort of the walker 64.

Figure 10:
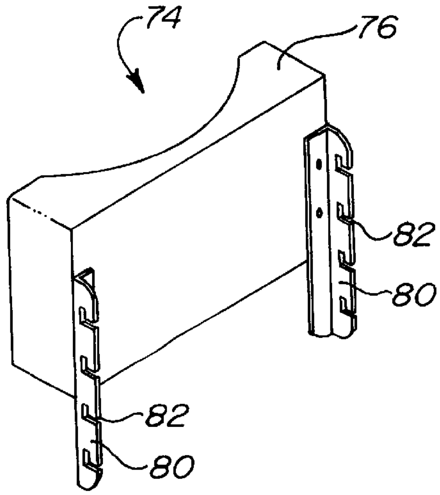
FIG. 10 is a rear isometric view of the head rest.

As seen in FIG. 10 a head rest 74 can be removably attached to the wheelchair 10. The head rest 74 is comprised of a padded member 76 having an arced portion 78 for receiving a user's head therein. A pair of rods 80 extend downwardly from the padded member 76. By way of example, the head rest 74 is attached to the back support frame 48 by providing one or more aligned L-shaped slots 82 on either rod 80. One pair of aligned slots 82 are registerable with the pair of pegs 54 on the side members 50 such that the pegs are received and rest within the closed part of the L-shaped slot 82. By providing more than one set of L-shaped slots 82, the head rest 74 is height adjustable for different sized users. The head rest 74 may be attached to the wheelchair 10 by any other appropriate means and may have any other appropriate height adjustment means.

Figure 18:
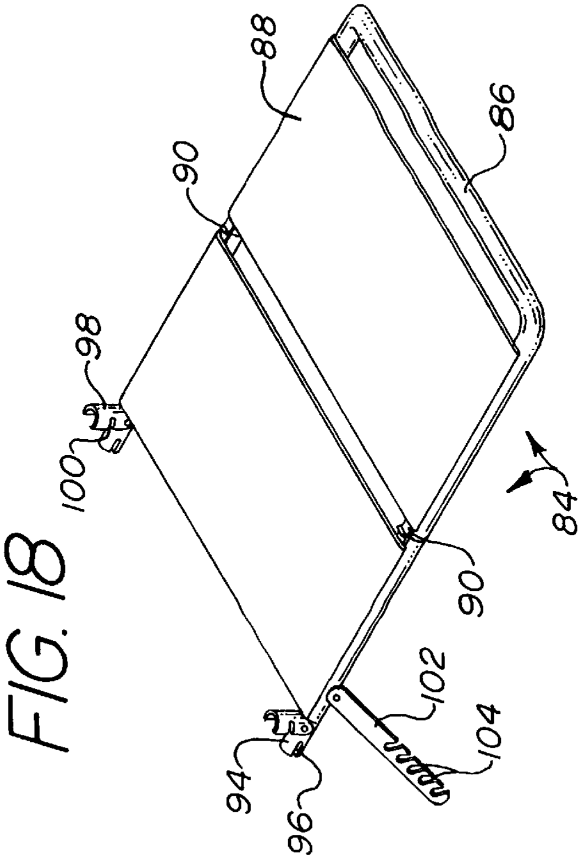
FIG. 18 is an isometric view of the leg rest.
Figure 19:
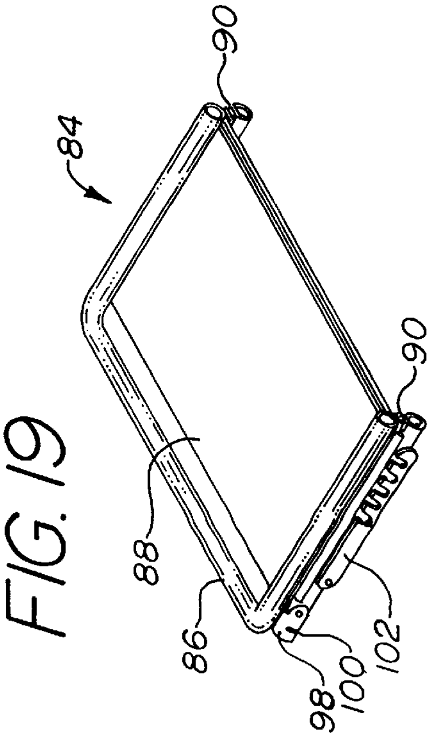
FIG. 19 is an isometric view of the leg rest in folded relation.
Figure 17:
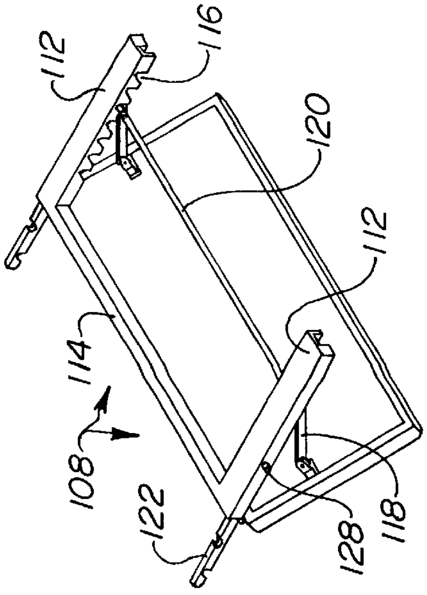
FIG. 17 is a bottom isometric view of the tray in extended and inclined position.

As seen in FIGS. 7, 18, and 19, a leg rest 84 can be removably attached to the wheelchair 10. The leg rest 84 is comprised of either a closed or open loop frame member 86 having one or more padded members 88 extending therebetween. If desired, the frame member 86 may have one or more hinges 90 in the center to permit foldable storage of the leg rest 84. By way of example, the leg rest 84 is removably secured to the wheelchair 10 by providing a peg 92 extending outwardly from each seat support rail 36. A first pair of hollow brackets 94, each having a first slot 96, extends outwardly from the end of the frame 86 in parallel orientation to each other. The ends of each seat support rail 36 are received within a hollow bracket 94 such that the pegs 92 pass through their respective slots 96. A second pair of semi-circular-shaped hollow brackets 98, each having a second slot 100, is hingedly attached, one each to one of the first hollow brackets 94. When the second pair of brackets 98 are articulated downwardly, the pegs 92 pass through the second slots 100. Once positioned, the second slots 100 are in perpendicular orientation to the first slots 96 and prevent the pegs 92 from receding from the two sets of slots thereby securing the leg rest 84 to the wheelchair 10. Any other appropriate means can be used to secure the leg rest 84 to the wheelchair 10.

As seen, the leg rest 84 can be selectively inclined above or below horizontal orientation. A generally flat bracket 102 is pivotally attached to each side of the frame 86. As seen, the bracket 102 has a plurality of notches 104. A peg 106 extends outwardly from each front leg 28. Each peg 106 is receivable within one of the notches 104 of the bracket 102 such that it supports the leg rest 84 in some level of incline. If desired, the notches 104 can be one way ramped. This system permits selective inclining of the leg rest 84 with a standard lawn chair-type mechanism known in the art.

As seen in FIGS. 8, and 15–17, a tray 108, having an encompassing lip 110, is removably attachable to the wheelchair 10. The tray 108 may be fixedly aligned or may be selectively inclinable. If the tray 108 is selectively inclinable, it can be comprised of a generally U-shaped frame having a pair of sides 112 connected by a base 114, and having one or more aligned notches 116 on each of the sides 112. The tray 108 is hingedly attached to the frame at the base 114. A pair of struts 118 is hingedly attached to the underside of the tray 108. A cross rod 120 connects the ends of the two struts 118 and extends beyond both. When the tray 108 is inclined, the ends of the cross rod 120 are received within one of the aligned notch pairs 116 for holding the tray 108 in position. If desired, the notches 116 may be one way ramped. Any other appropriate means may be utilized to achieve selective inclination of the tray 108.

The tray 108 may be attached to the wheelchair 10 in any appropriate fashion. By way of example, a support arm 122 is slidably disposed within each side 112. As seen, each support arm 122 has an upper notch 124 and a lower notch 126. The support arms 122 are inserted into the openings 34 and received with the channels located on the arm rest 32. A first rounded peg (not illustrated) is located on the upper part of each channel and a second rounded peg (not illustrated) is located on the lower part of the channel intermediate the first rounded peg and the opening 34. When the support arm 122 is fully received within the channel, the upper notch 124 is received within the first rounded peg and the lower notch 126 is received within the second rounded peg. The tray 108 is now supported through the cantilevered support of the cooperating notches and rounded pegs. A push button 128 activated locking means locks the support arms 122 in place in order to prevent undesired retraction.

Figure 11:
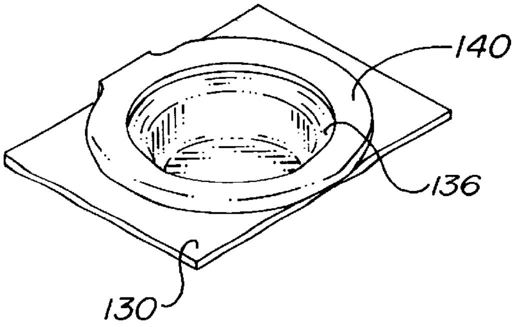
FIG. 11 is an isometric view of the toilet assembly.
Figure 12:
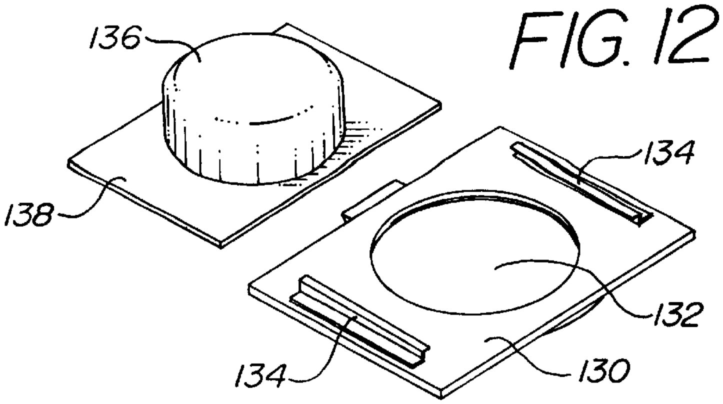
FIG. 12 is a bottom isometric view of the toilet assembly in disassembled relation.
Figure 15:
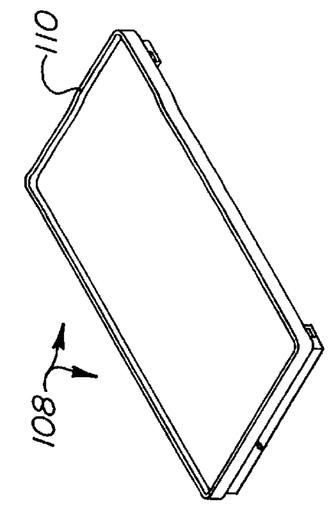
FIG. 15 is an isometric view of the tray in retracted position.
Figure 16:
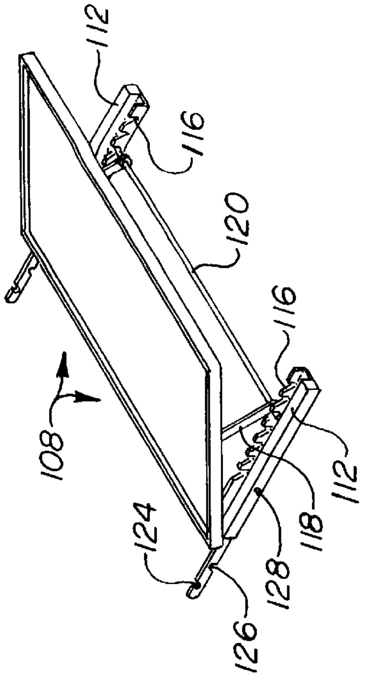
FIG. 16 is an isometric view of the tray in extended and inclined position.
Figure 13:
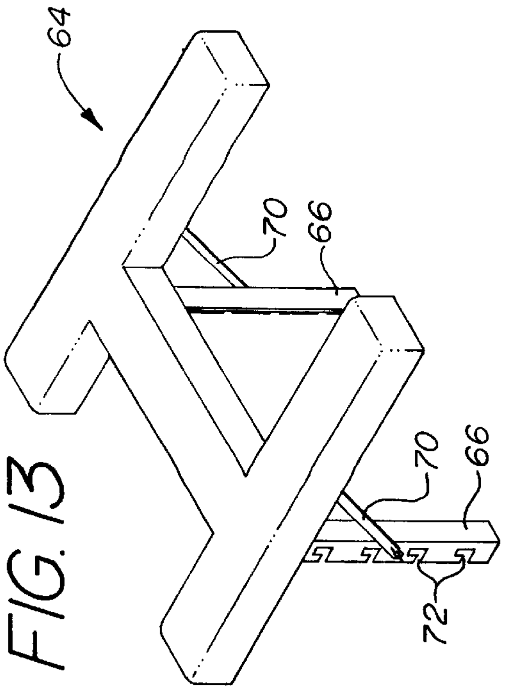
FIG. 13 is an isometric view of the walker.
Figure 14:
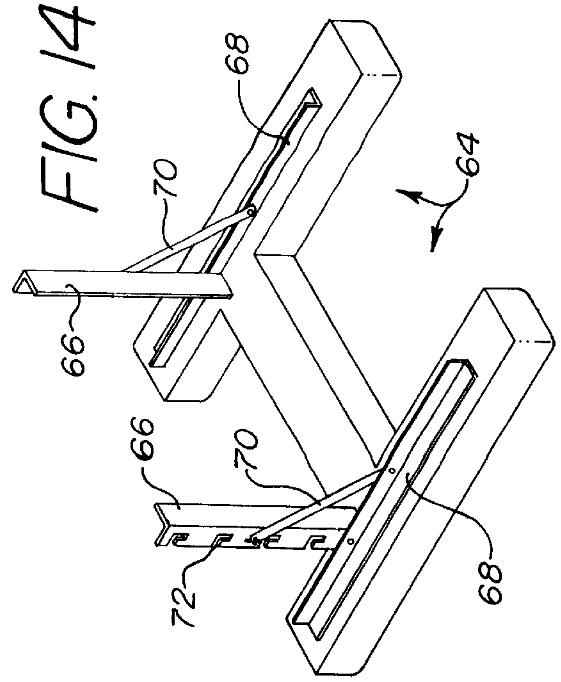
FIG. 14 is a bottom isometric view of the walker.

As seen in FIGS. 11 and 12, a toilet assembly is utilizable with the wheelchair 10 of the present invention. The toilet assembly is comprised of a base 130 having a centrally located opening 132 and a pair of tapered rails 134 on the underside. A bowl 136 has outwardly disposed flanges 138. The flanges 138 are slidably received within the rails 134 and are friction held in place due to the rail tapering. A seat 140 is either hingedly or fixed attached to the upper side of the base 130. In order to place the toilet assembly onto the wheelchair 10, the seat portion 44 is detached from one of the seat support rails 36. The toilet assembly is slid into place. The tapered rails 134 are positioned so that they abut the seat support rails 36 in order to provide a snug fit. Once the toilet assembly is in place, the bowl 136 may be removed and emptied without requiring the user to leave the toilet seat 140.

While the invention has been particularly shown and described with reference to an embodiment thereof, it will be appreciated by those skilled in the art that various changes in form and detail may be made without departing from the spirit and scope of the invention.

I claim:

1. A multifunction wheelchair comprising:

a platform having a top and a bottom;

a foot rest slidably attached to the bottom;

a plurality of castors extending downwardly from the bottom;

a chair, having a seat portion extending between a first support rail and a second support rail, attached to the platform;

a leg rest removably attachable to the chair proximate the seat portion, a selectively inclinable back support attached to the chair.

2. The device as in claim 1 wherein the seat portion is selectively removable from the first support rail.

3. The device as in claim 2 in combination with a toilet assembly removably positionable between the first support rail and the second support rail.

4. A multifunction wheelchair comprising:

a platform having a top and a bottom;

a foot rest slidably attached to the bottom;

a plurality of castors extending downwardly from the bottom;

a chair, having a seat portion extending between a first support rail and a second support rail such that the seat portion is selectively removable from the first support rail, attached to the platform;

a toilet assembly removably positionable between the first support rail and the second support rail; and a selectively inclinable back support attached to the chair.

5. The device as in claim 4 wherein the chair is removably attached to the platform.

6. The device as in claim 4 wherein the toilet assembly comprises:

a base;

a bowl attached to the base; and a seat attached to the base.

7. The device as in claim 6 wherein the bowl is removably attached to the base.

8. The device as in claim 6 wherein the seat is hingedly attached to the base.

9. The device as in claim 4 in combination with a first generally U-shaped padded walker removably attachable to the chair.

10. The device as in claim 9 wherein the walker is height adjustable relative to the ground.

11. The device as in claim 9 further comprising a second generally U-shaped portion integrally attached to the first U-shaped portion, facing in opposing direction to the first generally U-shaped portion.

12. The device as in claim 4 in combination with a head rest removably attachable to the chair.

13. The device in claim 12 wherein the head rest is height adjustable relative to the ground.

14. The device as in claim 4 in combination with a leg rest removably attachable to the chair proximate the seat portion.

15. The device as in claim 14 wherein the leg rest is selectively inclinable above and below the horizon.

16. The device as in claim 4 in combination with a tray removably attachable to the chair.

17. The device as in claim 16 wherein the tray is selectively inclinable.

18. A multifunction wheelchair comprising:

a platform having a top and a bottom;

a foot rest slidably attached to the bottom;

a plurality of castors extending downwardly from the bottom;

a chair, having a seat portion extending between a first support rail and a second support rail, attached to the platform;

a first generally U-shaped padded walker removably attachable to the chair; and a selectively inclinable back support attached to the chair.

19. The device as in claim 18 wherein the walker is height adjustable relative to the ground.

20. The device as in claim 18 further comprising a second generally U-shaped portion integrally attached to the first U-shaped portion, facing in opposing direction to the first generally U-shaped portion.

* * * * *